March 27, 1962 R. D. KREHBIEL Re. 25,147

CONTROL VALVE FOR MULTIPLE VALVE BANKS

Original Filed Oct. 27, 1958 4 Sheets-Sheet 1

ROBERT D. KREHBIEL
INVENTOR.

BY Hubert Miller

ATTORNEY

CONTROL VALVE FOR MULTIPLE VALVE BANKS

Original Filed Oct. 27, 1958 4 Sheets-Sheet 2

INVENTOR.
ROBERT D. KREHBIEL
BY Hubert Miller
ATTORNEY

CONTROL VALVE FOR MULTIPLE VALVE BANKS

Original Filed Oct. 27, 1958 4 Sheets-Sheet 3

ROBERT D. KREHBIEL
INVENTOR.

BY Hubert Miller

ATTORNEY

CONTROL VALVE FOR MULTIPLE VALVE BANKS

Original Filed Oct. 27, 1958 4 Sheets-Sheet 4

ROBERT D. KREHBIEL
INVENTOR.

BY Hubert T. Miller

ATTORNEY

United States Patent Office

Re. 25,147
Reissued Mar. 27, 1962

25,147

CONTROL VALVE FOR MULTIPLE VALVE BANKS

Robert D. Krehbiel, Hutchinson, Kans., assignor to Cessna Aircraft Company, Wichita, Kans., a corporation of Kansas Original No. 2,954,051, dated Sept. 27, 1960, Ser. No. 769,638, Oct. 27, 1958. Application for reissue Sept. 25, 1961, Ser. No. 141,569
13 Claims. (Cl. 137—622)

Matter enclosed in heavy brackets [ ] appears in the original patent but forms no part of this reissue specification; matter printed in italics indicates the additions made by reissue.

This invention relates generally to fluid flow control valves and more particularly to a spool type control valve particularly designed for cooperative association in a bank of independently operable but similar control valves, whether the bank be made up of separable interchangeable valve units, or made as a single unitary housing defining multiple spool bores, certain common and certain individual flow passages, ports, ducts, etc.

Multiple valve banks of this general type are common, and are widely used to centralize operator control of multiple circuits in hydraulic systems for road machinery, agricultural machinery, mechanical shovels, etc. The individual valves in such a bank may be designed to control various type of hydraulic servo motors, such as both single and double acting working cylinders, vane type rotary actuators, etc. The individual valves in such banks have registering transverse through passages which together constitute at least one and often two common pressure fluid passageways through the entire bank from which each valve may direct pressure fluid to the cylinder or other hydraulic appliance which it controls. Each individual valve in such a bank also conventionally has two separated transverse through passages, one near each of its ends, which respectively register with similar passages in the adjacent valves to form two common fluid return passageways through the entire valve bank, and into which each valve may direct return fluid from the cylinder or motor which it controls.

While the provision of the two mentioned fluid return passageways through the bank has always been considered necessary, it has at least two decided disadvantages. Duplicate passageways necessarily increase the overall length of each valve in the bank. They also seriously complicate the internal design of the various valves in the bank, especially when it is desired to include in the bank valves which control double acting cylinders and other valves which control single acting cylinders, or one or more valves which return fluid to the tank or reservoir through a separate return line rather than through a common return passageway in the bank.

It is a primary object of this invention to provide valves for association and cooperation in a bank, which valves include only a single common fluid return passageway through the bank in conjunction with a fluid transfer passage through which fluid may be by-passed from either end of the valve to the other for purposes which will be fully explained herein.

By eliminating one common return passageway through all valves in the bank, my invention makes possible a reduction in the overall length of each valve in the bank. In a multiple unit valve bank this reduces the surface area which must be sealed against similar surface areas of adjacent valves in the bank, thus reducing possible leakage points. By shortening the housing it also reduces the chances of warping or distorting the individual housings, when they are forced together to provide necessary sealing pressure.

Use of only a single common return passageway through all valves in the bank, in combination with a transfer passage extending along but separate from the valve spool bore, makes it possible for the common return to be connected with various flow passages at a desired location along the spool bore and this in turn simplifies valve design. It also makes it possible to include a larger number of different types of valves in a single bank.

It is an additional object of the invention to provide a valve which includes the mentioned common through pressure and return passageways and the fluid transfer passage, yet which also may include an independent fluid return port through which fluid can be returned directly to the system reservoir at a pressure which varies materially from the pressure of fluid passing through the single common return passageway in the bank, thus eliminating slow return of the plunger of a lightly loaded single acting cylinder for instance, due to higher return pressure in the common return passageway.

Another object is to provide a control valve having the above mentioned desirable features which may be of either the open or closed center type, for controlling single acting, double acting and float position cylinders.

The invention, together with other objects, will be more clearly understood when the following description is read in connection with the accompanying drawings, in which.

Figure 1:
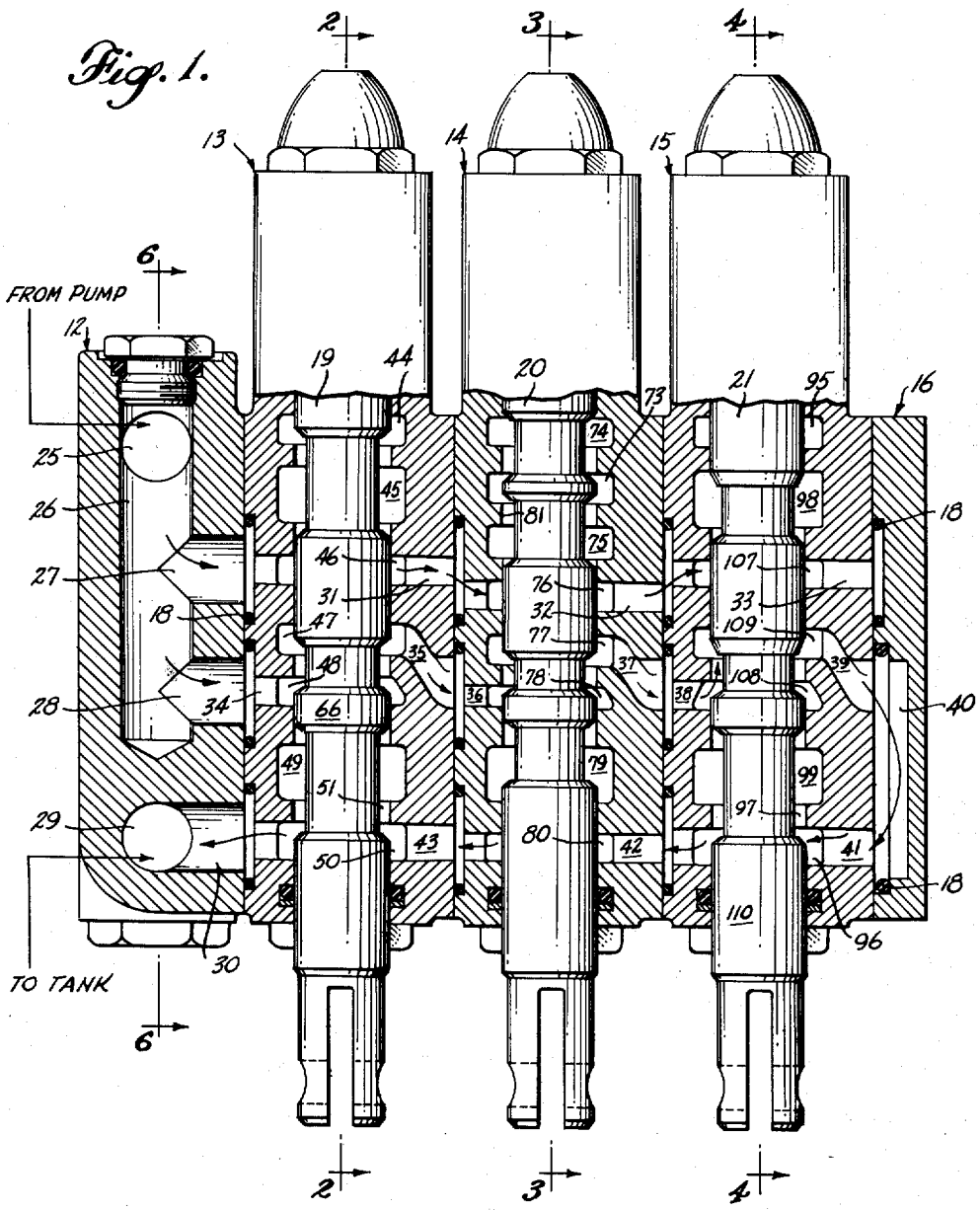
FIG. 1 is a sectional view through a valve bank which includes three associated and cooperating valves in series with an end plate at each end of the bank, each of said valves embodying the invention.
Figure 3:
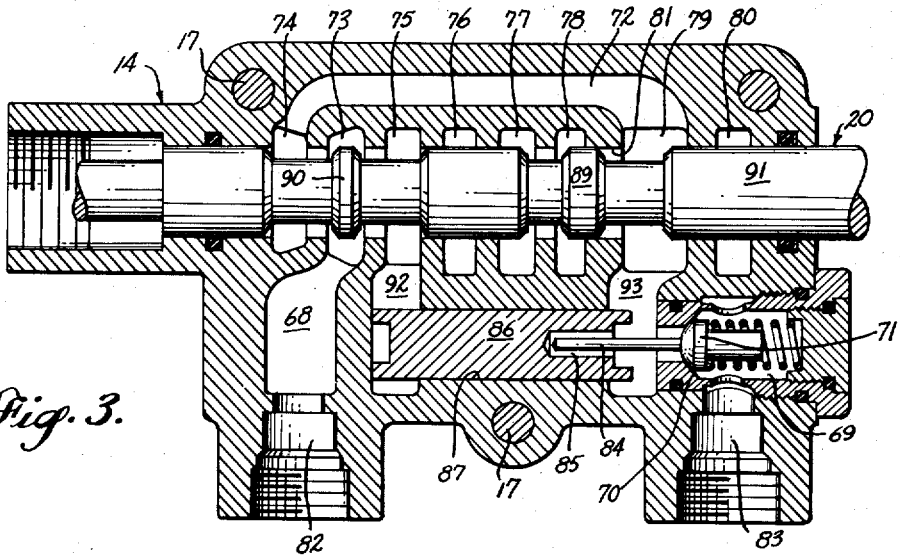
Figure 4:
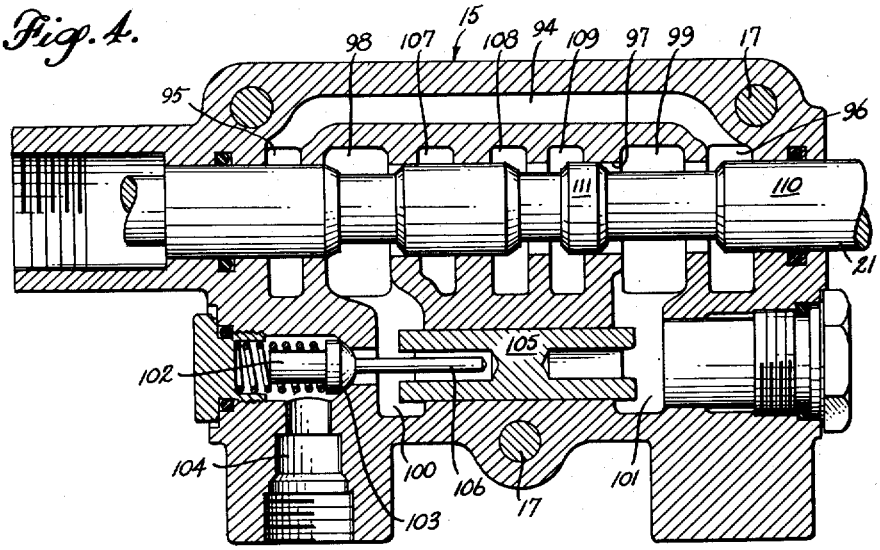
Figure 5:
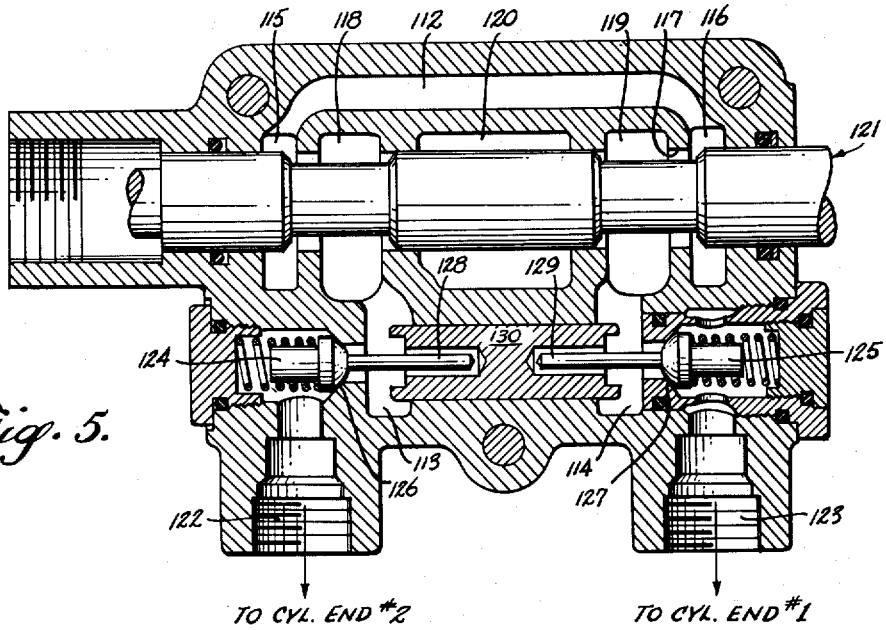
Figure 6:
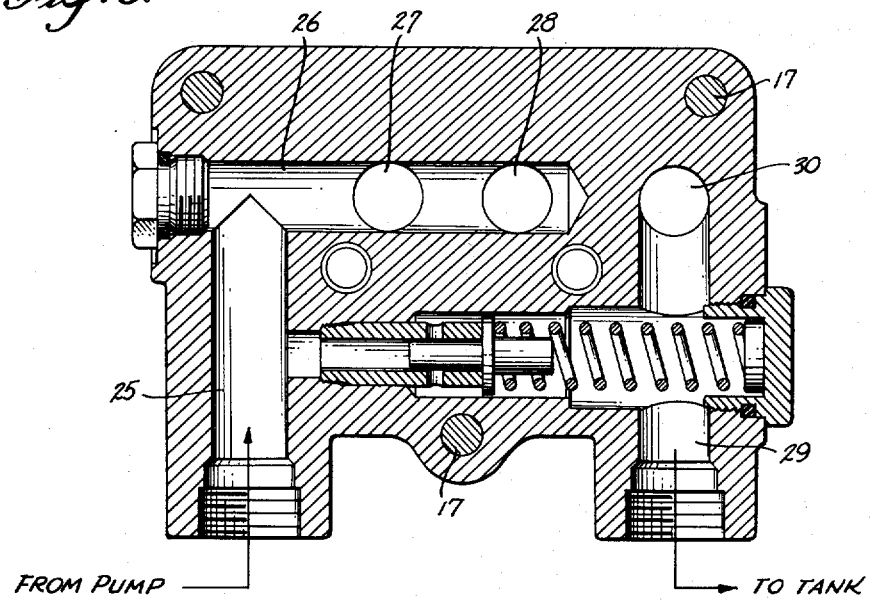

FIGS. 3 and 4 are similar sectional views through two different types of open center single acting control valves, taken along the lines 3—3 and 4—4 respectively of FIG. 1;

FIG. 5 is a similar longitudinal central sectional view through a closed center double acting control valve, also embodying the invention; and FIG. 6 is a section view through the valve bank connection plate, and is taken along the line 6—6 of FIG. 1.

Before describing the details of construction and operation of the several illustrated valves which embody the invention it should be understood that any number of differently designed and functioning valves of the general type before mentioned may be associated in such a valve bank in any sequence. This disclosure is being restricted to the four types of valves shown for the purposes of clarity and illustration only.

Referring to FIG. 1, a control valve bank is illustrated which is made up of a connection plate 12, a double acting valve 13, a single acting valve with separate fluid return 14, a single acting valve 15 which dumps return fluid into a common fluid return passageway, and an end plate 16. These valves are respectively illustrated in detail in FIGS. 2, 3, and 4. The individual valve housings are held in assembled relation by bolts 17 and O-ring seals 18 between adjacent housings prevent leakage of fluid.

Each housing is provided with a longitudinally disposed annularly grooved bore which bores slidably receive valve spools 19, 20, and 21. Each spool is normally maintained in its neutral position, as shown in FIGS. 1 to 5 inclusive by a conventional spring actuated spool centering mechanism, one of which is shown in detail in FIG. 2, the spring and its oppositely acting washers being identified respectively by the numerals 22, 23, and 24.

Referring to FIG. 1, the connection plate housing 12 is provided with a pressure fluid inlet port 25 which receives fluid from the pump (not shown), and a connecting transverse passage 26 which communicates with short ducts 27 and 28. Housing 12 also has a fluid return port 29 which communicates with a short duct 30. Port 29 is connected to a line leading to a fluid reservoir or tank, not shown.

With all valve spools 19, 20 and 21 in their neutral positions, and with the pump delivering pressure fluid to the end plate, pressure fluid is present in the transverse through pressure passageway made up of the respective transverse communicating ducts 31, 32 and 33, each of which communicates with the spool bore in its respective housing. Also pressure fluid is flowing from the end plate housing 12 through the communicating second through pressure passageway made up of the transverse staggered neutral by pass ducts 34 to 39 in the respective valve housings, through passage 40 in the end plate 16, through the common transverse return passageway made up of transverse ducts 41 to 43 and thence to the tank through duct 30 and port 29.

FIG. 2 VALVE—CONSTRUCTION

Figure 2:
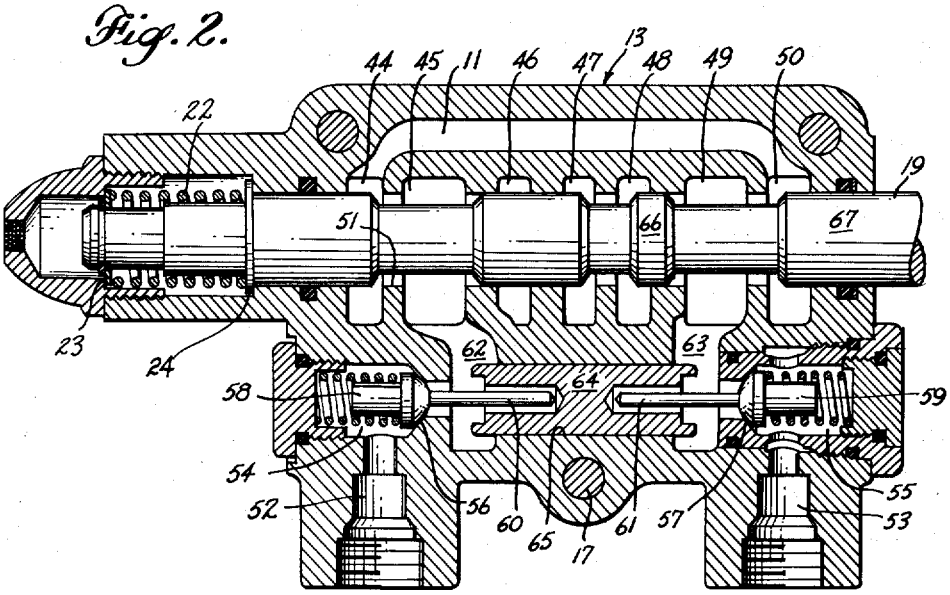
FIG. 2 is a longitudinal central sectional view through an open center double acting control valve, and is taken along the line 2—2 of FIG. 1.

Referring to FIG. 2, the housing of valve 13 includes a series of axially spaced annular grooves which form chambers 44 to 50 all of which communicate with the spool bore 51. A longitudinally disposed fluid transfer passage 11 affords communication between chambers 44 and 50. Chamber 50 is of course a part of the common return passageway 41—43.

This valve is designed for control of a double acting working cylinder and is consequently provided with two motor ports 52 and 53, which are connected respectively to opposite ends of a cylinder to be controlled. The motor ports communicate respectively with lock out check valve chambers 54 and 55 provided with valve seats 56 and 57. The seats cooperate with spring seated check valves 58 and 59 which are provided with inwardly projecting aligned valve unseating stems 60 and 61.

Communication between chamber 45 and valve seat 56 is afforded by a first transmission duct 62, while a second transmission duct 63 affords communication between chamber 49 and valve seat 57, and hence with motor port 53. It will thus be seen that the transmission ducts 62 and 63 serve to transmit fluid between the spool bore 51 and respective points of fluid use, in this case to and from the opposite ends of the cylinder to be controlled, as well as to integral pressure chambers utilized for unseating check valves 58 and 59.

The means for unseating check valves 58 and 59 is a reciprocable fluid pressure actuated plunger 64 slidable in a bore 65 of complemental cross section, the axis of which is aligned with valve stems 60 and 61. The inner ends of these two stems project into aligned seats in the opposite ends of plunger 64, as clearly shown in FIG. 2.

FIG. 2 VALVE—OPERATION

Still referring to valve 13 and to both FIGS. 1 and 2 of the drawing, when spool 19 is moved to the left in FIG. 2 (inward) spool land 66 moves away from that portion of the spool bore proper which it normally seals. When land 66 has moved far enough to the left to block communication between chambers 47 and 48, and consequently between ducts 34 and 35 (FIG. 1) pressure builds up in chamber 48 and fluid flows through chamber 49, through transmission duct 63, valve seat 57 and port 53 to the connected end of the cylinder (not shown).

As a result of the mentioned inward spool movement, spool land 67 blocks flow of pressure fluid from the pressure passage or duct 34 through the transfer passage 11 to the first transmission duct 62.

With the spool in its left hand position pressure fluid in the lower end of transmission duct 63 forces plunger 64 to the left, unseating check valve 58. Fluid from the opposite end of the cylinder being operated is thus free to return to the tank through port 52, valve seat 56, transmission duct 62, chambers 45 and 44, transfer duct 11, common return passage 41—43 (which includes chamber 50), duct 30, and return port 29.

Similarly by shifting valve spool 19 outwardly (to the right in FIG. 2) from its neutral position, motor port 52 will be open to the through pressure passageway 31—33, through chambers 46 and 45 and transmission duct 62. Plunger 64 will be moved to the right in FIG. 2 to unseat check valve 59, and motor port 53 will be open to the transmission duct 63, common return passageway 41—43 and to the tank. The spool in this right hand position blocks flow of fluid from pressure chamber 46 through transfer passage 11 to the other transmission duct 63.

FIG. 3 VALVE—CONSTRUCTION

The FIG. 3 valve is designed for control of a single acting cylinder, and instead of directing return fluid from the controlled cylinder into the common return passageway 41—43 in the valve bank, the returning fluid is discharged into a separate return line (not shown) which is connected directly to the tank, a separate return port being provided in the valve housing for this purpose. The separate return is a decided advantage in case the cylinder being controlled operates only a light load and the light load is incapable of forcing fluid from the cylinder into the higher pressure existing in the common through return passageway 41—43 in the valve bank.

In common with the described FIG. 2 valve, the FIG. 3 valve includes a corresponding longitudinally disposed fluid transfer passage 72, the opposite ends of which communicate with the spool bore 81 through enlarged diameter annular chambers 74 and 79. It will be noted that the right hand end of transfer passage 72 does not, in this case, connect with chamber 80, which constitutes a part of common return passage 41—43.

Also in common with the FIG. 2 valve, this FIG. 3 valve includes two outlet ports, one a fluid return port 82 which is connected by separate line (not shown) to the tank, and the other a motor port 83 which is connected by line to the cylinder to be controlled. This valve also includes two fluid transmission ducts 92 and 93 which correspond to ducts 62 and 63, and serve to transmit fluid between the spool bore 81 and respective points of use. In this case transmission duct 93 transmits fluid between the bore and the cylinder to be operated, and duct 92 transmits fluid between the bore and the blind chamber formed by the lower end of the duct itself, at which point the fluid is utilized to force plunger 94 to the right.

Valve 14 also includes a corresponding series of enlarged diameter axially spaced annular grooves which form chambers 73 to 80 inclusive, all of which communicate with spool bore 81. A short duct 68 connects chamber 73 with return port 82. Chamber 75 connects the spool bore with transmission duct 92. Chamber 76 communicates with transverse duct 32 (FIG. 1) which in turn constitutes a part of the transverse pressure passageway 31—33 through the bank. Similarly, chambers 77 and 78 communicate respectively with the transverse ducts 36 and 37, which constitute parts of the neutral by-pass pressure fluid passageway 34—39 (FIG. 1). Chamber 79 connects spool bore 81 with transmission duct 93. Chamber 80 communicates with transverse through return passageway 31—43 (FIG. 1).

Still referring to FIG. 3, motor port 83 and the lower end of transmission duct 93 are connected through a lockout check valve chamber 69 having a seat 70 which cooperates with a spring pressed check valve 71. Valve is provided with a valve unseating stem 84, which projects into and is aligned with a blind bore 85 in a plunger 86. Plunger 86 is slidable in a bore 87 in the valve housing, and the opposite ends of this plunger are subjected to pressure fluid in the two transmission ducts 92 and 93. A cannelured valve spool 20, slidable in bore 81, completes the assembly. The valve spool is spring biased to its neutral position by means of a spring and washer assembly identical to that shown in the FIG. 2 valve.

FIG. 3 VALVE—OPERATION

When spool 20 is shifted to the left, land 89 cuts communication between chambers 77 and 78 and land 90 cuts communication between chambers 74 and 73. Pressure fluid passes from chamber 78 through chamber 79, transmission duct 93, valve seat 70 and out through motor port 83 to the cylinder. The spool may be returned to its neutral position and the plunger in the connected working cylinder will be maintained in its "up" position because check valve 71 prevents fluid from flowing from the cylinder into transmission duct 93.

To allow the load to return the plunger in the working cylinder to its initial position spool 20 is shifted to the right (FIG. 3) of its neutral position. Pressure fluid then flows from transverse pressure passageway 31—33 (FIG. 1) through chamber 75 into transmission duct 92 to a point of use in the lower end of that duct. The fluid in the transmission duct exerts force on the left hand end of plunger 86, forcing it to the right and unseating check valve 71 through its stem 84.

The load on the working cylinder plunger now forces fluid from the cylinder through motor port 83, through valve seat 70, transmission duct 93, chamber 79, transfer duct 72, chambers 74 and 73, duct 68 and out through return port 82 to the tank.

With the spool in this right hand position pressure fluid is blocked by lands 89 and 90 from entering the chambers 79 and 74 respectively, at opposite ends of the transfer duct. Spool land 91 prevents returning fluid from entering the transverse through return passageway, because the land 91 blocks communication between chambers 79 and 80.

From the above it will be seen that this valve also utilizes the two transmission ducts and the transfer passage, as in the FIG. 2 valve, but accomplishes different results.

FIG. 4 VALVE—CONSTRUCTION

Referring now to FIGS. 1 and 4, the construction and operation of valve 15 will now be explained. Valve 15 is also an open center valve for controlling a single acting working cylinder, but is designed to direct fluid returning from the working cylinder into the common transverse return passageway 41—43 through the bank, rather than into a separate return line, as in the FIG. 3 valve. Here again the combination of the two fluid transmission ducts and the transfer duct is used to accomplish a different result.

A comparison of FIGS. 2 and 4 of the drawing will show that the housings of the two illustrated valves are very similar. The primary differences are that motor port 53 and check valve 59 of the FIG. 2 valve have been omitted from the FIG. 4 valve.

The internal chamber arrangement includes a longitudinally disposed fluid transfer passage 94 with annular chambers 95 and 96 at its opposite ends communicating with the spool bore 97, chamber 96 also constituting a part of common return passageway 41—43. It includes annular chambers 98 and 99 which communicate respectively with two spaced fluid transmission ducts 100 and 101 which correspond to and serve purposes similar to the transmission ducts in the previously described valves by transmitting fluid between the spool bore and respective points of use. In this case transmission duct 98 transmits fluid to and from the single acting working cylinder to be operated, through a check valve 102, a seat 103 therefor, and a motor port 104. Transmission duct 101 transmits fluid between the spool bore 97 and the blind chamber formed by the lower end of the duct itself, at which point the pressure fluid is utilized to force a plunger 105 to the left to contact an aligned valve stem 106 and thereby unseat check valve 102.

The valve housing also includes a bore communicating annular chamber 107 which constitutes a part of transverse pressure passageway 31—33 through the bank. Similarly annular chambers 108 and 109 communicate respectively with transverse ducts 38 and 39 (FIG. 1) which constitute parts of neutral by-pass pressure fluid passageway 34—39. A spring centered cannelured valve spool 21 completes the assembly.

FIG. 4 VALVE—OPERATION

When spool 21 is shifted to the right of its neutral position pressure chamber 107 is placed in open communication with chamber 98. Pressure fluid flows through transmission duct 100, valve seat 103 and motor port 104 to the cylinder or motor to be actuated. There is no flow of pressure fluid elsewhere in the housing.

When spool 21 returns to its neutral position check valve 102 seats and prevents return of fluid from the actuated cylinder thus holding the plunger in that cylinder in the position to which it was moved by the pressure fluid.

When spool 21 is shifted to the left of its FIG. 4 neutral position chambers 95 and 98 are placed in open communication. Simultaneously chambers 99 and 109 are placed in open communication and land 110 blocks communication between chambers 96 and 99. Communication between chambers 108 and 109 is also blocked by land 111. Pressure fluid flows to the lower blind end of transmission duct 101 where it exerts pressure on plunger 105, moves that plunger to the left, and thus opens check valve 102. Fluid is thus free to flow from the actuated cylinder through valve seat 103, transmission duct 100, chambers 98 and 95, transfer duct 94, chamber 96 and into the common return passageway 42—43.

FIG. 5 VALVE—CONSTRUCTION

FIG. 5 illustrates the invention embodied in a closed center valve for controlling a double acting cylinder, and like the previously described valves, it includes a longitudinally disposed fluid transfer passage 112 and cooperating fluid transmission ducts 113 and 114.

It will be understood by those familiar with this art that a plurality of closed center valves may be associated together in a valve bank similar to the open center valve bank illustrated in FIG. 1. The term "closed center" simply means that the neutral by-pass pressure passageway made up of the staggered ducts 34 to 39 in FIG. 1 is eliminated, and there is no continuous flow of pressure fluid through the valve bank and back through the common transverse return passageway.

The FIG. 5 valve includes two spaced annular chambers 115 and 116 which communicate with the opposite ends of transfer passage 112 and with the spool bore 117. Chamber 116 also communicates with and constitutes a part of the common return passageway through the bank just as chamber 50 of the FIG. 2 valve constitutes a part of the common return passageway 41—43 in the FIG. 1 valve bank.

The FIG. 5 valve also includes spaced annular chambers 118 and 119 which communicate respectively with transmission ducts 113 and 114 and with the spool bore. A central transverse through pressure duct 120 communicates with similar ducts in other valves in the bank (not shown), and serves to deliver pressure fluid to either of the transmission ducts 113 or 114 when the valve spool 121 is shifted to the proper position.

This valve is provided with spaced motor ports 122 and 123 which are connected respectively to opposite ends of a double acting working cylinder by suitable lines, not shown.

Free flow of return fluid from each motor port is prevented by spring pressed check valves 124 and 125 seated respectively on seats 126 and 127 which communicate respectively with the lower ends of transmission ducts 113 and 114. The check valves have integral aligned stems 128 and 129, respectively, which project into aligned blind bore type seats in the opposite ends of a free floating plunger 130, the opposite ends of which are exposed to pressure fluid in the respective transmission ducts 113 and 114.

FIG. 5 VALVE—OPERATION

When spool 121 is shifted to the left of its neutral position communication is established between pressure duct 120 and chamber 119, open communication is maintained bewteen chambers 115 and 118, and communication is blocked between chambers 119 and 116.

Pressure fluid flows through transmission duct 114, through valve seat 127 by forcing the valve 125 off its seat, through motor port 123 and to the number 1 end of the working cylinder to be actuated.

Simultaneously pressure fluid in the lower end of transmission duct 114 forces plunger 130 to move to the left of its FIG. 5 position. In so moving plunger 130 contacts and moves valve stem 128, unseating valve 124.

Fluid from the number 2 end of the working cylinder is thus free to flow into the valve housing through motor port 122, through valve seat 126, transmission duct 113, chambers 118 and 115, transfer duct 112 and into the common transverse return passageway in the valve bank through chamber 116, and thence to the tank or reservoir.

In similar manner shifting of the valve spool 121 to the right of its neutral position sends pressure fluid from pressure duct 120 to the number 2 end of the working cylinder, causes check valve 125 to be unseated, and permits fluid returning from the number 1 end of the working cylinder to flow through transmission duct 114 into common return chamber 116. At this time communication between chambers 115 and 118 is blocked and transfer passage 112 is thus cut off from pressure fluid.

The flexibility in valve design afforded by the longitudinal transfer passage in each of the described valves will be more clearly understood if it is realized that the transfer passage not only permits the use of a single common return passageway through the valve bank, but that this common return passageway may be located at or near either end of the bank. In other words the location of the return passageway is not restricted to the location shown in FIG. 1.

From the above explanation and description it will be seen that in all four illustrated embodiments of the invention the fluid transfer passage communicates at its opposite ends with the valve spool bore and its ends communicate through said bore with the respective fluid transmission ducts. Also in each valve the spool is effective in one position to afford flow of pressure fluid from the transverse fluid supply means in the bank into one transmission duct while blocking the flow of pressure fluid from the fluid supply means through the transfer passage into the other transmission duct; and the spool is effective in a second position to afford flow of pressure fluid from the fluid supply means into the other transmission duct while blocking the flow of pressure fluid from the fluid supply means through the transfer passage into the first mentioned transmission duct.

It is also a common feature of all said valves that the spool is effective in a third position to afford communication between at least one of said transmission ducts and the transfer passage while blocking communication between the fluid supply means and both transmission ducts.

Having described the invention with sufficient clarity to enable those familiar with this art to construct and use different types of valves embodying the invention, I claim:

1. A control valve structure for association and cooperation with other similar valves in a valve bank in which the various valves have registering transverse through pressure passages which constitute pressure fluid supply means extending through the bank and have additional registering transverse through return passages which constitute fluid disposal means extending through the bank, said control valve structure comprising: a housing having a longitudinally disposed valve spool receiving bore therein; annular grooves constituting spaced chambers surrounding and communicating with said bore; transverse passages communicating with said bore through at least one of said chambers and arranged to cooperate in providing pressure fluid supply means through all housings in the bank; a fluid return passage in the housing [communicating with said bore]; first and second transmission ducts in the housing communicating with said bore at longitudinally spaced locations, and constituting means to transmit fluid between said bore and respective points of use; a longitudinally disposed fluid transfer passage in the housing communicating at its opposite ends with said bore, said opposite ends being positioned to communicate through said bore with the respective transmission ducts, said transfer passage also being in communication with the fluid return passage; and a cannelured valve spool reciprocable in said bore, said spool being effective in a first position to establish communication between the fluid supply means and the first transmission duct while blocking communication between the fluid supply means and the second transmission duct; said spool being effective in a second position to establish communication between the fluid supply means and the second transmission duct while blocking communication between the fluid supply means and the first transmission duct, and effective in at least one of said positions to simultaneously establish communication, via the transfer passage, between the return passage and that transmission duct which is at that time blocked from communication with the fluid supply means.

2. The valve described in claim 1 in which the spool is effective in a third and neutral position to afford communication between at least one of said transmission ducts and the transfer passage while blocking the flow of fluid from the fluid supply means into either transmission duct.

3. The valve described in claim 1 in which one end of said fluid transfer passage and at least one of said transmission ducts are simultaneously in open communication with said return passage, regardless of spool position.

4. A control valve structure for association and cooperation with other similar valves in a valve bank in which the various valves have registering transverse through pressure passages which constitute pressure fluid supply means extending through the bank and have additional registering transverse through return passages which constitute fluid disposal means extending through the bank, said control valve structure comprising: a housing having a longitudinally disposed valve spool receiving bore therein; transverse passages in the housing communicating with said bore and arranged to cooperate with similar passages in other housings to provide pressure fluid supply means extending through the bank; a fluid return passage in the housing communicating with said bore; a fluid outlet port in the housing; a fluid transmission duct affording communication between the bore and said outlet port; a longitudinally disposed fluid transfer passage communicating at its opposite ends with said bore, said transfer passage communicating through the bore with said transmission duct and with said return passage; and a cannelured valve spool slidable in said bore and effective in a first position to afford communication between the fluid supply means and said outlet port through said transmission duct, effective in a second position to afford flow of fluid from said outlet port through said transmission duct and through the transfer passage into the return passage, and effective in a third and neutral position to block communication between the fluid supply means and said transmission duct.

5. The valve described in claim 4, and a spring seated check valve interposed between said outlet port and said transmission duct and normally preventing flow of fluid from said outlet port into said transmission duct; and means responsive to movement of said spool into said second position to open said check valve.

6. A control valve structure for association and cooperation with other similar valves in a valve bank in which the various valves have registering transverse through pressure passages which constitute pressure fluid supply means extending through the bank and have additional registering transverse through return passages which constitute fluid disposal means extending through the bank, said control valve structure comprising: a housing having a longitudinally disposed valve spool receiving bore therein; annular grooves constituting spaced chambers surrounding and communicating with said bore; transverse passages communicating with said bore through at least one of said chambers and arranged to cooperate in providing pressure fluid supply means through all housings in the bank; a fluid return passage in the housing communicating with said bore; first and second transmission ducts in the housing communicating with said bore at longitudinally spaced locations, and constituting means to transmit fluid between said bore and respective points of use; a longitudinally disposed fluid transfer passage in the housing communicating at its opposite ends with said bore, said opposite ends being positioned to communicate through said bore with the respective transmission ducts, said transfer passage also being in communication with the fluid return passage; and a cannelured valve spool reciprocable in said bore, said spool being effective in a first position to establish communication between the fluid supply means and the first transmission duct, between the second transmission duct and one end of the transfer duct, and between the second transmission duct and the return passage, while blocking communication between the first transmission duct and the adjacent end of the transfer passage; said spool being effective in a second position to establish communication between the fluid supply means and the second transmission duct, between the first transmission duct and one end of the transfer duct, and between the first transmission duct and the return passage, while blocking communication between the second transmission duct and the adjacent end of the transfer passage.

7. A control valve structure for association and cooperation with other similar valves in a valve bank in which the various valves have registering transverse through pressure passages which constitute pressure fluid supply means extending through the bank and have [addtional] *additional* registering transverse through return passages which constitute fluid disposal means extending through the bank, said control valve structure comprising: a housing having a longitudinally disposed valve spool receiving bore therein; transverse passages in the housing communicating with said bore and with similar passages in adjacent similar housings to provide pressure fluid supply means for the bank and to provide a single fluid return passageway for the bank; [a pair of] *first and second* longitudinally spaced fluid outlet ports; [a pair of] *first and second* longitudinally spaced fluid transmission ducts in the housing affording communication between the respective outlet ports and said bore; a longitudinally disposed fluid transfer passage communicating at its opposite ends with the bore, and through the bore with the respective transmission ducts, one end of said transfer passage also being in communication with *the* return passageway; and a cannelured fluid flow controlling valve spool shiftable in said bore and effective in a first position to block communication between the first transmission duct and the return passageway and between the first transmission duct and the transfer passage, *and* to afford flow of fluid from the fluid supply means outward through the first outlet port via the first transmission duct, while simultaneously affording inward flow of fluid from the second outlet port through the connected second transmission duct and through the transfer passage into the single return passageway; said spool being effective in a second position to block communication between the second transmission duct and the return passageway via the transfer passage, *and* to afford outward flow of fluid from the fluid supply means through the second outlet port via the second transmission duct, while affording inward flow of fluid from the [second] *first* outlet port through the [second] *first* transmission duct into the single return passageway.

8. The valve described in claim 7, and two normally closed check valves in the housing located and oriented to afford fluid flow outward from the fluid supply through the respective outlet ports, and to normally prevent reverse inward flow therefrom; and fluid pressure actuated means responsive to movement of the spool into said first position to open that check valve which controls flow through the second outlet port, and responsive to movement of the spool into said second position to open that check valve which controls flow through the first outlet port.

9. The valve described in claim 8 in which each check valve is provided with a stem, and the two stems project toward each other in substantial alignment, and the fluid pressure actuated means is a floating plunger, said plunger being reciprocably mounted in an open ended bore which exposes the opposite ends of the plunger to pressure fluid in the respective transmission ducts, said plunger being located between and in substantial alignment with said valve stems to contact and move either of them to unseat the respective valves.

10. A control valve structure comprising a plurality of similar valve housings cooperatively associated in a bank, each having a longitudinal valve spool receiving bore communicating with a plurality of transverse passages so spaced and arranged as to form continuous pressure fluid supply means extending through the structure as well as a single continuous fluid return passage extending through the structure, said return passage being located near respectively adjacent ends of the respective housings; ports in the housings, one near that end of each housing remote from said fluid return passage, each port communicating with the bore in its housing; a longitudinally disposed fluid transfer passage in each housing communicating at its opposite ends with the bore in its housing, one end of each transfer passage also communicating with said return passage, and the other end thereof being positioned to communicate through the bore with the remote port in its housing; and a cannelured flow controlling spool reciprocable in the bore of each housing, each spool being effective in one position to afford flow of fluid from the said port in its housing through its respective transfer passage into said return passage, while blocking communication between the fluid supply means and said port, and between the fluid supply means and the transfer passage in its housing.

11. A control valve adapted for inclusion in a multiple unit valve bank comprising: a housing having a longitudinal valve spool receiving bore; a transverse through pressure passage in the housing; a transverse through return passage in the housing, both said passages communicating with said bore and with similar passages in adjacent similar housings to provide continuous pressure and return passageways through the bank; a motor port and a separate fluid return port in said housing, both communicating with said bore; a longitudinally disposed fluid transfer passage in the housing communicating at its opposite ends with said bore and affording fluid flow between the two ports; a cannelured fluid flow controlling valve spool reciprocable in said bore, said spool being effective in one position to connect the pressure passage and the motor port and to simultaneously block communication between the two ports via the transfer passage, and effective in a second position to connect the two ports via the transfer passage while blocking the pressure passage from both ports, and effective in all its permitted positions to block communication between the transverse through return passage and both said ports.

12. The valve described in claim 11, and a spring seated check valve interposed between the motor port and the bore, and normally preventing flow of fluid from the motor port to the fluid return port via the transfer passage; and means responsive to movement of said spool into said second position to unseat said check valve to afford flow of fluid from the motor through the transfer passage and out through the fluid return port.

13. In a contol valve structure in which two or more similar valve housings are cooperatively associated in a bank, each housing having a longitudinal valve spool receiving bore, the structure also having a plurality of bore communicating transverse passages in the housings so spaced and arranged as to cooperate with each other to form continuous pressure fluid supply means extending through the bank, said structure also having one or two motor ports in each housing communicating with the respective bores, one port in each housing being located near that end thereof which is adjacent the corresponding and similarly ported end of each other housing, each housing being provided with a cannelured valve spool reciprocable in the housing bore and effective when moved to a first position therein to afford fluid flow from said supply means outward through said one port, the combination with the described structure of bore communicating transverse passages in the housings so positioned as to communicate with each other and with the respective housing bores to form a single continuous fluid return passage extending through the bank; a longitudinally disposed fluid transfer passage in each housing communicating at its opposite ends with the bore in its housing, one end of each transfer passage also communicating with said return passage and the other end thereof being positioned to communicate through the bore with the said one port in its housing, the spool in each housing being effective when moved to a second position to afford flow of fluid from the said one port in its housing into and through its respective transfer passage into said return passage while blocking communication between the fluid supply means and said one port and between the fluid supply means and the transfer passage in its housing.

References Cited in the file of this patent or the original patent

UNITED STATES PATENTS

| | | |
|---|---|---|
| 2,247,141 | Twyman | June 24, 1941 |
| 2,517,153 | Wood | Aug. 1, 1950 |
| 2,586,932 | Gardiner et al. | Feb. 26, 1952 |
| 2,689,585 | Presnell | Sept. 21, 1954 |
| 2,707,867 | Ruhl | May 10, 1955 |